Figure 1:
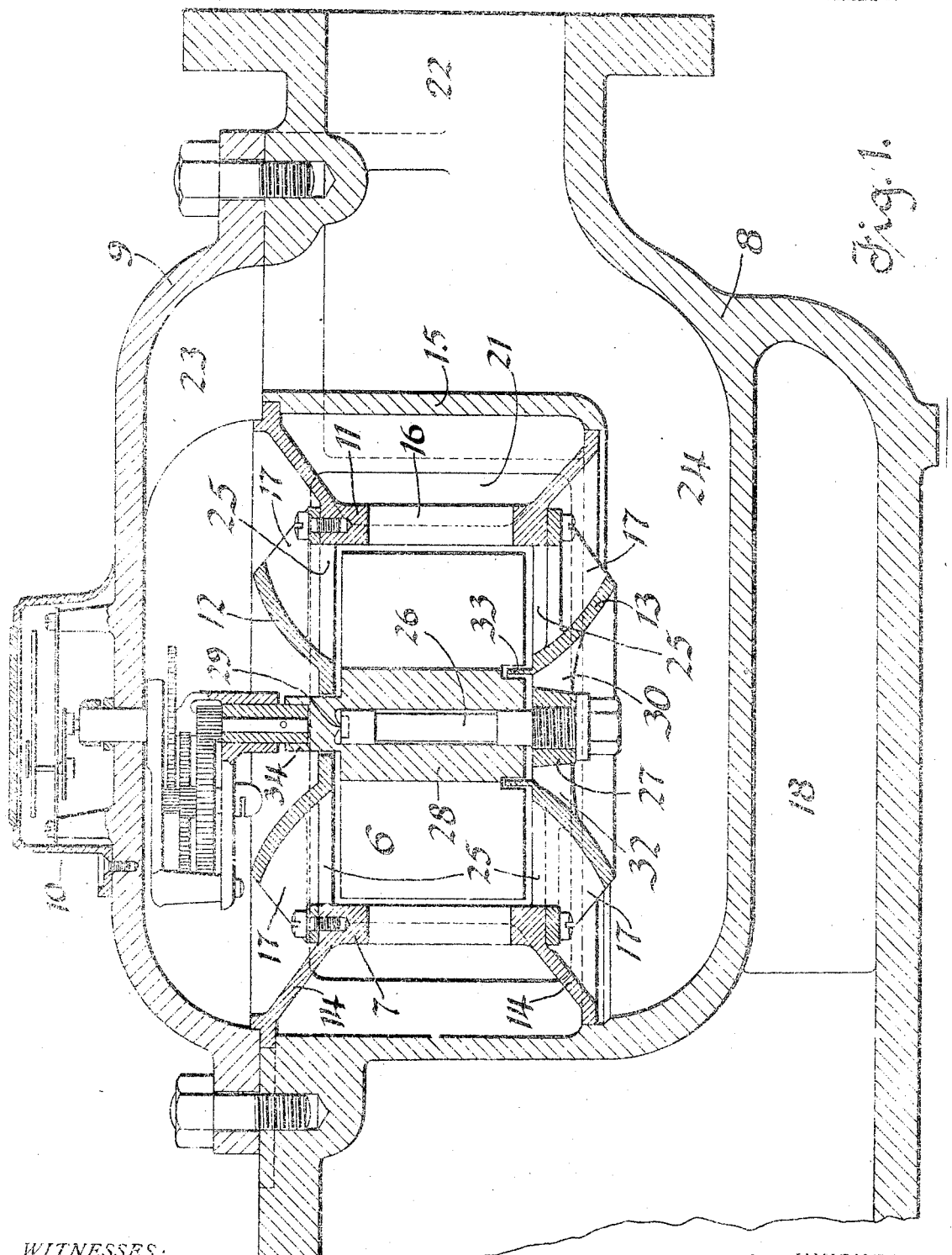

D. A. MUNROE.
WATER METER.
APPLICATION FILED MAR. 14, 1908.

1,056,438.

Patented Mar. 18, 1913.

3 SHEETS—SHEET 2.

WITNESSES:

INVENTOR.
Daniel A. Munroe
BY
his ATTORNEY IN FACT.

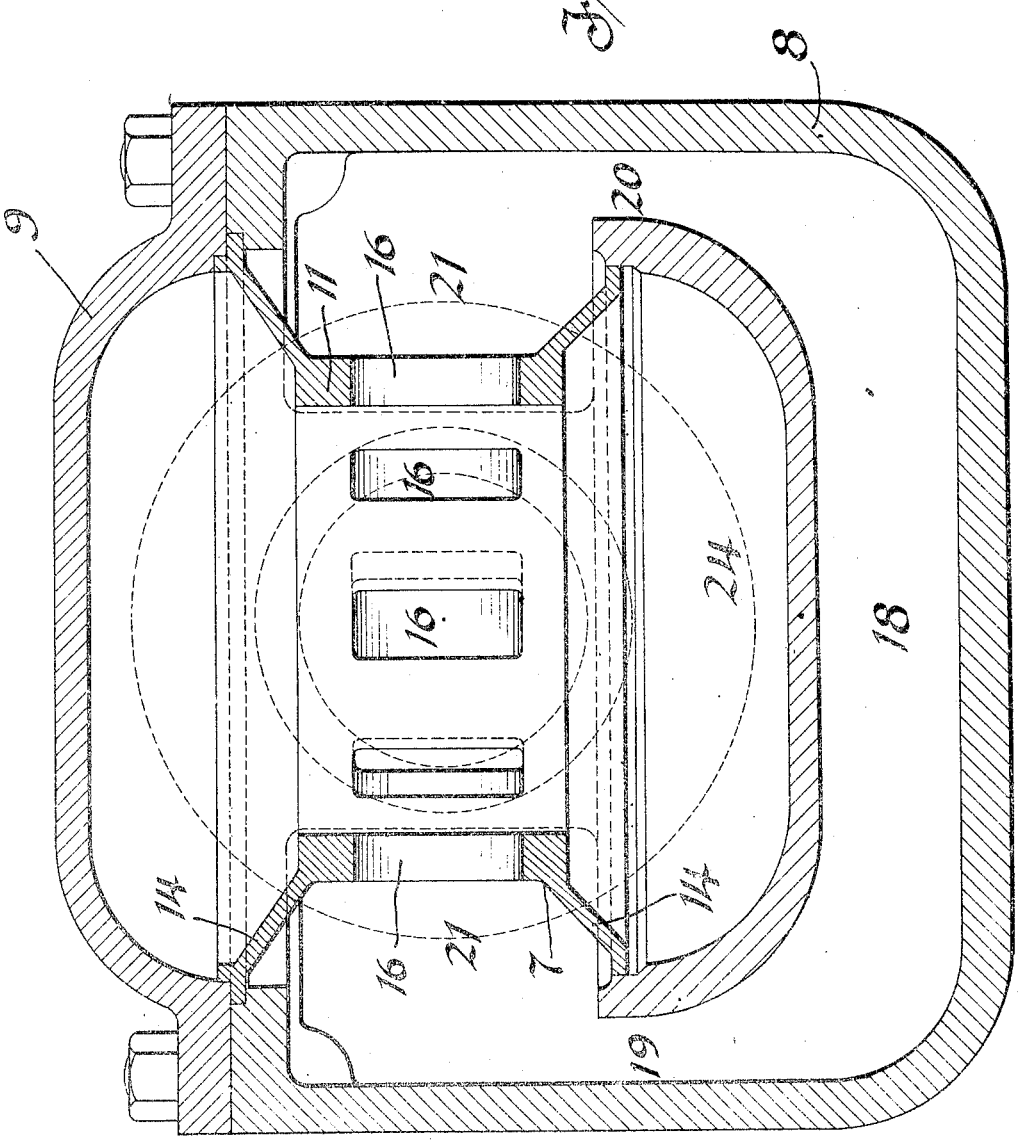

UNITED STATES PATENT OFFICE.

DANIEL A. MUNROE, OF WILKINSBURG, PENNSYLVANIA, ASSIGNOR TO PITTSBURG METER COMPANY, A CORPORATION OF PENNSYLVANIA.

WATER-METER.

1,056,438. Specification of Letters Patent. Patented Mar. 18, 1913.

Application filed March 14, 1908. Serial No. 421,090.

*To all whom it may concern:*

Be it known that I, DANIEL A. MUNROE, a citizen of the United States, and a resident of Wilkinsburg, in the county of Allegheny and State of Pennsylvania, have made a new and useful Invention in Water-Meters, of which the following is a specification.

This invention relates to meters and more particularly to water meters of the type having a wing wheel rotated by the water traversing the passages of the meter which operates the indicating and registering mechanism of the meter.

An object of my invention is the production of a meter of this type in which the lateral or sidewise thrust on the wing wheel is counterbalanced.

A further object is the production of a meter of this type in which the longitudinal as well as the lateral thrust on the wing wheel is counterbalanced.

These and other objects I attain in a meter embodying the features hereinafter described and illustrated in the drawings accompanying this application and forming a part thereof.

Figure 2:
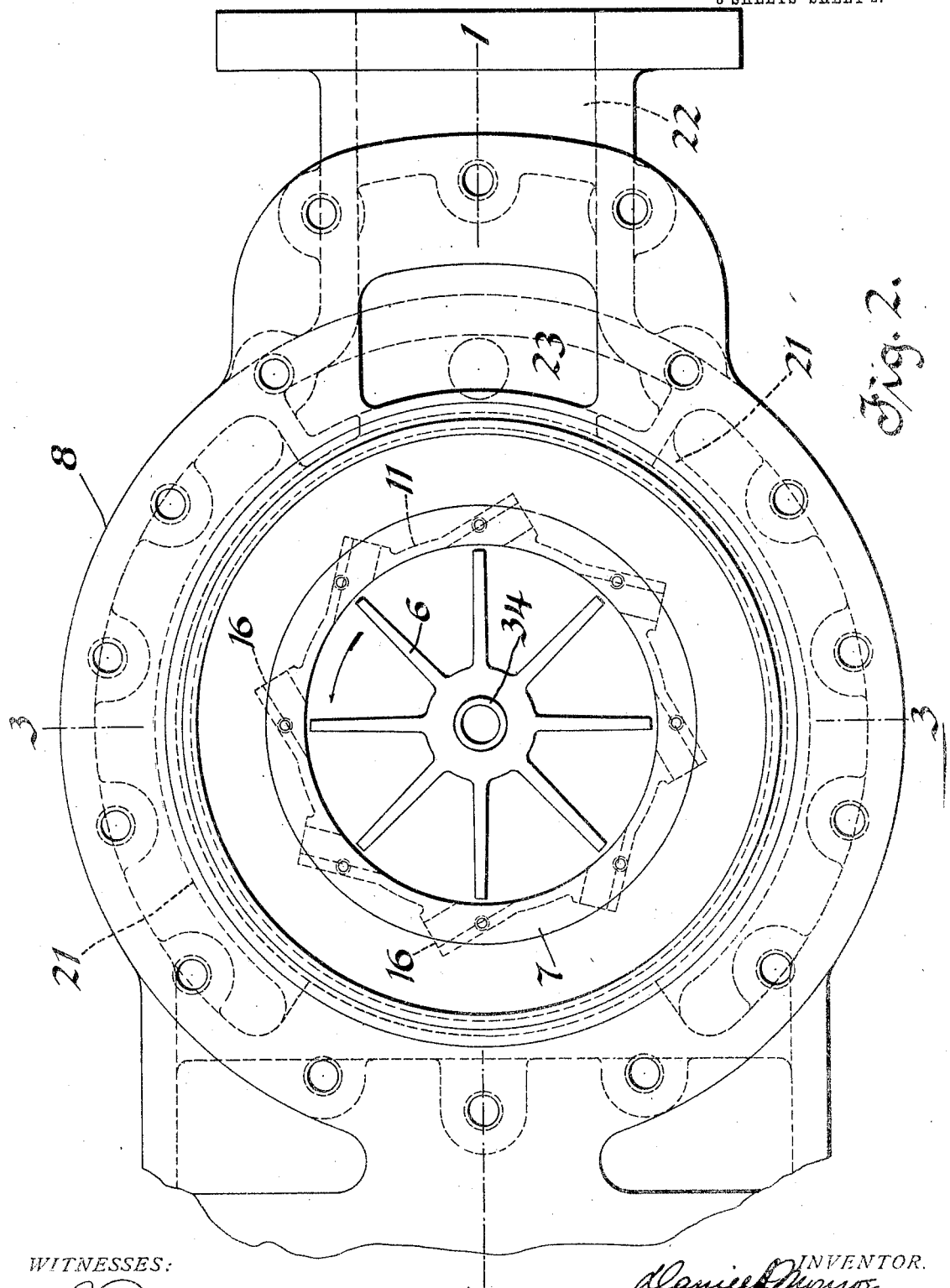

In the drawings: Figure 1 is a longitudinal section of a meter embodying my invention and is taken along the line 1—1 of Fig. 2; Fig. 2 is a plan view of the meter shown in Fig. 1, portions thereof having been removed for convenience of illustration; and, Fig. 3 is a section along the line 3—3 of Fig. 2.

Various attempts have been made to produce a water meter in which the wing wheel is balanced, both laterally and longitudinally, but, so far as I know, no one has been successful in producing such a meter. The lateral or sidewise thrust of the wing wheel is ordinarily occasioned by an improper arrangement of the water passages within the meter which permits the water to have freer access to, or freer egress from one side than the other of the wing wheel.

In the meter illustrated a wing wheel 6 is inclosed within a wheel casing 7, which is in turn inclosed within and supported by a casing 8. The casing 8, which may be termed the outer or meter casing, is provided with a cover portion 9 secured thereto and provided with an indicating and registering mechanism 10. The wheel casing 7 consists of a cylindrical portion 11 and top and bottom portions 12 and 13 secured thereto by suitable screws. The cylindrical portion is provided with annular flanges 14 supported on shoulders formed on a diaphragm or partition 15 of the casing 8, and which coöperate with the cover portion 9 in securing the casing 7 in place.

A plurality of peripherally-located ports 16 extend through the cylindrical portion 11 of the casing and deliver water to the interior of the casing and consequently to the blades of the wing wheel 6. The top and bottom portions 12 and 13 are each provided with a plurality of ports 17 so proportioned, relative to the combined area of the inlet ports, that the water delivered to the wing wheel is divided into two streams, one of which is discharged through the ports of the top portion 12 and the other through the ports of the bottom portion 13.

The casing 8 is provided with an inlet port (not shown) which communicates through a passage 18 with two passages 19 and 20 located within the casing 8 and which deliver water to a passage 21 surrounding the wheel casing and formed between it and the diaphragm 15. The passages 19 and 20 connect with the passage 21 on diametrically opposite sides of the wheel casing 7.

The ports 17 of the top portion 12 communicate with a discharge port 22 formed in the casing, through a passage 23 located above the wheel casing, and the discharge ports of the bottom portion 13 communicate with the port 22 through a passage 24 located below the wheel casing.

A set of radially-extending retarding vanes 25 is formed integrally with the top portion and a set is formed integrally with the bottom portion, and each set is located between the outlet ports of its respective supporting member and the adjacent ends of the blades of the wing wheel. These vanes are so proportioned and arranged that they cause eddy currents within the casing 7 during the operation of the meter, which tend to retard the wing wheel.

Under ordinary conditions the wheel tends to move faster, in proportion to the amount of water passing through the meter, for heavy loads than for light loads, since the only resistance encountered is the mechanical inefficiency of the apparatus, and this remains constant while the accelerating forces increase as the flow of water through the meter increases. With the retarding vanes located as illustrated the effect of the eddy currents created by the retarding vanes increases in a direct ratio to the increase of flow through the meter and consequently the retarding forces imposed upon the wing wheel increase as the accelerating forces of the wing wheel increase and the tendency of the meter to overregister for heavy flows is overcome.

The wing wheel is rotatably mounted on a pivot shaft 26 threaded into a collar 27 and which extends upwardly through the hub portion 28 of the wing wheel 6 and forms a bearing for a pivot point 29 on the wing wheel. The collar 27 is supported by radially-extending webs 30 formed integrally with the bottom portion 13. This construction provides ports 32 between the collar 27, the webs 30 and the body portion 11, which expose the lower end of the hub portion 28 to the water pressure of the passage 24. An annular flange 33 is formed integrally with the body portion and, extending upwardly into the interior of the casing, surrounds the lower end of the hub portion 28 and to some extent restricts the flow of water from the interior of the casing through the ports 32 into the passage 24.

The upper end of the hub portion 28 is provided with a projection 34 which extends through a suitable opening formed in the top portion 12 and which engages, through the agency of a suitable driving connection, an operating shaft of the indicating mechanism 10.

In meters as ordinarily constructed, one end of the wing wheel is usually exposed to the pressure existing within the wing wheel casing, while the other end of the wing wheel is partially exposed to the pressure within the casing and partially exposed to the pressure of an outlet passage exterior to the casing. Such an arrangement causes a preponderance of longitudinal thrust in one direction and the ordinary result is that the wing wheel floats off its bearing or is held by too great a pressure against its bearing. This difficulty is overcome by providing the ports 32 and subjecting the lower end of the hub portion 28 to the water pressure of the passage 24 instead of the water pressure existing within the casing 7. With such an arrangement the areas of the upper end of the hub portion exposed to the water pressure within the casing 7 and the water pressure within the passage 23 may be so proportioned that the longitudinal thrust due to static pressure in the water of the passage 24 will be sufficient to balance both the downward thrust occasioned by the static pressure of the water within the casing and the weight of the wing wheel.

The operation of the meter is as follows:—The water entering the meter through the admission port enters the passage 18 and is divided into two streams, one of which passes through the passage 19 and is delivered to the passage 21 on one side of the wheel casing 7 and the other of which passes through the passage 20 and is delivered to the passage 21 on the other side of the casing 7 at a point diametrically opposite the point of delivery of the passage 19. With such an arrangement there is no tendency whatever for the impinging force of the water delivered through the ports 16 to cause a preponderating lateral thrust on the wing wheel 6 in one direction, since the thrust occasioned by the free access of water to the wheel 6 through the port or ports 16 directly adjacent to the delivery end of the passage 19 is counterbalanced by an equal and opposite thrust occasioned by the free access of the water through the port or ports 16 directly adjacent to the delivery end of the passage 20.

The water delivered to the wing wheel 6 by the ports 16 is divided in its passage through the interior of the casing 7 into two streams, one of which is delivered through the ports between the vanes 25 of the top portion to the passage 23 and from there to the discharge port 22 and the other of which is delivered to the ports between the vanes 25 of the bottom portion and the passage 24 to the port 22. By this arrangement the wing wheel is balanced both longitudinally and laterally.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In a water meter, an outer casing, an inner casing having outlet ports in the top and bottom, a wing wheel within the inner casing, said inner casing having inlet ports arranged peripherally thereof and partitions in said outer casing forming vertical passages of equal areas whereby water is delivered to diametrically opposite sides of said wheel for the purpose of counterbalancing the lateral thrusts on said wheel.

2. In a water meter, a wing wheel, a casing surrounding said wheel, an outer casing provided with partitions arranged to form vertical passages of equal areas so that the water pressures to which the wheel is subjected balance the lateral thrusts thereof for all flows.

3. In a water meter, a wing wheel, a wheel casing provided with a multiple number of peripherally arranged inlet ports and outlet ports in its top and bottom, an outer casing and partitions in the outer casing providing vertical passages of equal areas, so that water is delivered to diametrically opposite inlet ports under the same pressures for all flows.

In testimony whereof, I have hereunto subscribed my name this 11th day of March, 1908.

DANIEL A. MUNROE.

Witnesses:
CHARLES W. MCGHEE,
E. W. MCCALLISTER.